Nov. 10, 1964    T. O. MURRAY    3,156,492
SKID CONTROL AND TRACTION DEVICE FOR VEHICLES
Filed Dec. 14, 1962    2 Sheets-Sheet 1

INVENTOR.
Thomas O. Murray
BY James R. McKnight
Attorney.

Nov. 10, 1964 T. O. MURRAY 3,156,492
SKID CONTROL AND TRACTION DEVICE FOR VEHICLES
Filed Dec. 14, 1962 2 Sheets-Sheet 2
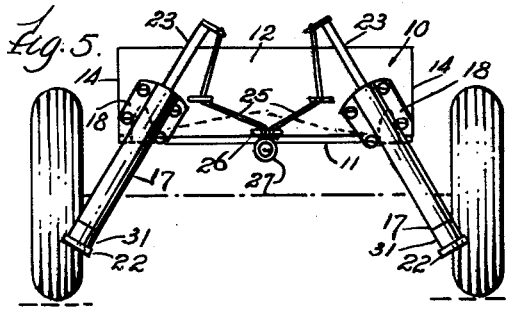
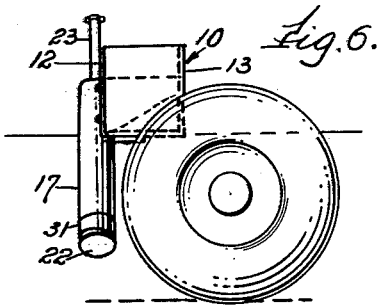
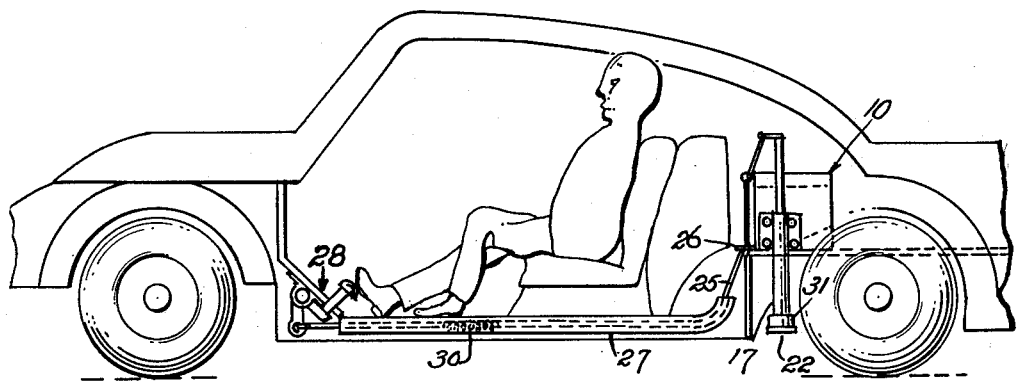
INVENTOR.
Thomas O. Murray.
BY James R. McKnight
Attorney.

United States Patent Office 3,156,492
Patented Nov. 10, 1964

3,156,492
SKID CONTROL AND TRACTION DEVICE
FOR VEHICLES
Thomas O. Murray, 1127 N. State St., Chicago 10, Ill.
Filed Dec. 14, 1962, Ser. No. 244,609
2 Claims. (Cl. 291—42)

My invention relates to a device adapted to be installed in an automobile, airplane, or other vehicles for dispensing sand, salt, or the like in front of the rear wheels to provide traction and to prevent skidding.

Frequently during the winter months, ice will form on the pavement after a rain or sleet storm, or light snow, and will cause a very slippery surface. In under passes or bridges where there is a slight incline this slippery surface causes increased skidding and sliding. This condition prevents normal traction and the resulting skidding puts cars out of control causing accidents with injury and damage. Starting from either such a slippery surface or from deeper snow is difficult or often impossible It is among the objects of my invention to solve these problems, by providing a device adapted to be installed in a car, plane or other vehicle, said device having a container for holding sand, salt or the like, positioned to be released in front of the rear wheels.

Another object of my invention is to supply means so that the driver may control the release of the sand and the amount to be released, from the seat in the vehicle.

My invention also comprises such other objects, advantages and capabilities as will later more fully appear, and which are inherently possessed by my invention.

While I have shown in the accompanying drawings, a preferred embodiment of my invention, yet it is to be understood that the same is susceptible of modification and change without departing from the spirit of my invention.

Figures 1, 2:
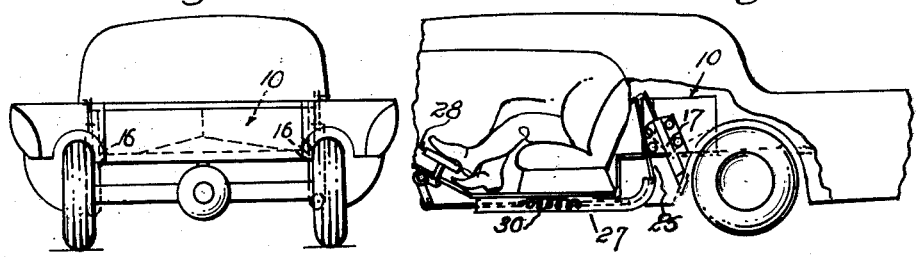
Figure 3:
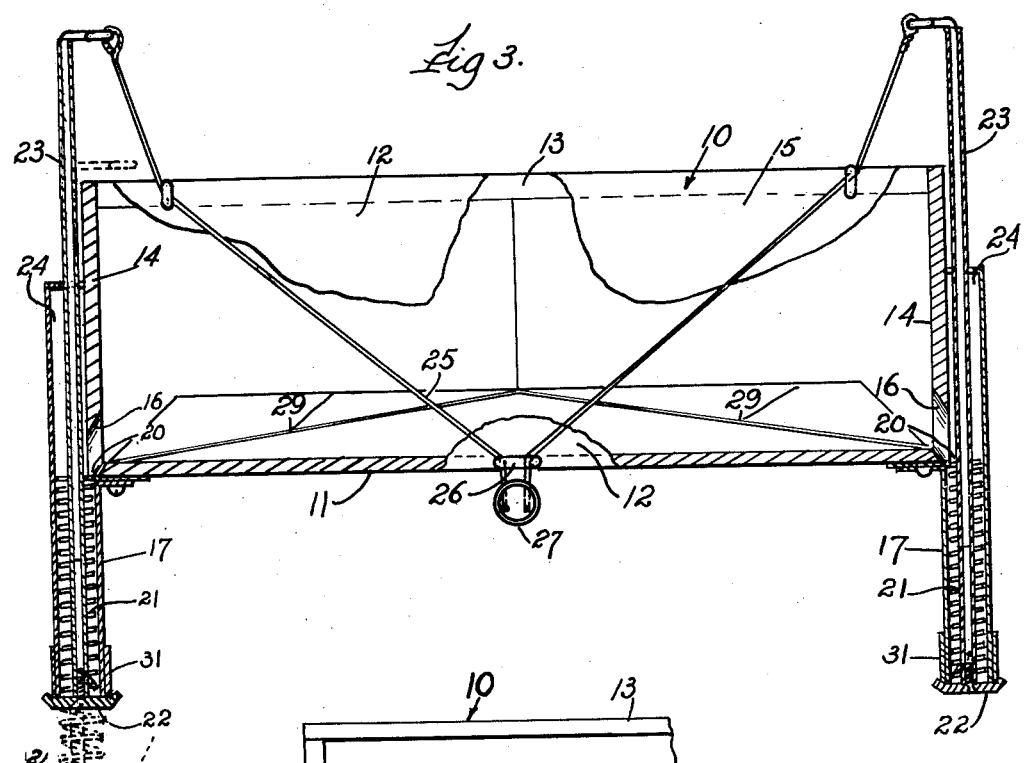
Figure 4:
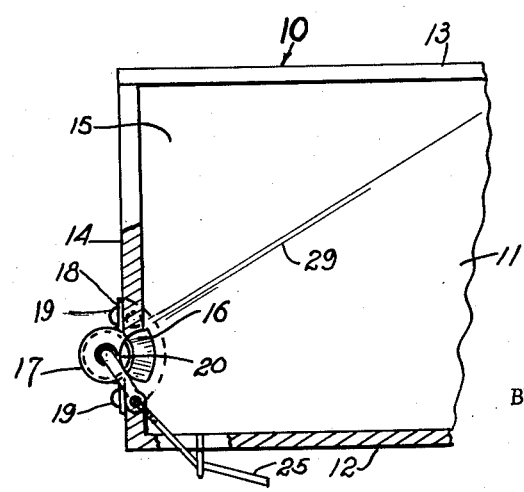

Referring to the drawings, FIG. 1 is a rear view and FIG. 2 a side elevational view of a car showing the position of my device with relation to the rear wheels; FIG. 3 is an enlarged sectional view of the preferred form of my device; FIG. 4 is a detailed top plan view of one corner of my container; FIG. 5 is a detailed view showing another embodiment of my tubes; FIG. 6 is a side elevational view of FIG. 5; and FIG. 7 is a cut away side elevational view of a car embodying my device.

The embodiment selected to illustrate my invention comprises a container 10, having a bottom 11, front wall 12, rear wall 13, and spaced side walls 14, with an open top portion 15. A hole 16 is cut through bottom 11 adjacent each of the opposite side walls 14.

A tube 17 at substantially its middle portion is cut transversely to substantially half of its diameter, with substantially half of the upper portion bent to form a flap or bracket 18 positioned against end wall 14 and attached thereto by suitable means such as screws 19, with opening 20 positioned under hole 16. A hollow coiled spring 21 is housed within the lower hollow portion of tube 17, said spring extending up to opening 20. A cap or closure valve 22 is attached to the lower end of spring 21, and is larger than tube 17, so that in normal retracted position of spring 21, cap 22 closes the lower open end of tube 17. A rod 23 is attached at its lower end to the top of spring 21 and extends slidably upwardly within and above the hollow half circular upper portion 24 of tube 17.

The indentical construction as heretofore set forth for tube 17 and the other following numbered parts up to and including upper portion 24 are provided for the opposite end wall 14.

To the upper end of each rod 23 is attached a wire 25 leading to a connector 26 at the center of front wall 12. From connection 26, wires 25 are housed in a tube 27 leading to and connected with a pedal 28 positioned on the floor of the car adjacent the driver's seat. By pushing downwardly on pedal 28, wires 25 move rods 23 to push springs 21 downwardly with caps 22 away from the open bottom ends of tubes 17. This permits the sand to pour downwardly by gravity. Since tubes 17 have been positioned through suitable openings in the trunk floor of the car, so that they extend just in front of the rear tires of the car, the sand pours on the pavement directly in front of the tires and provides traction so that the tires have something to grip on and can move the car. It also provides traction so that skidding is prevented or stopped.

My container 10 is of sufficient size to hold a substantial supply of sand, salt, or other similar flowable material, and is adapted to be positioned in the trunk of the car, with openings provided in the trunk for passage of the tubes therethrough so that the tubes are positioned above but slightly in front of the rear tires of the vehicle. This is so the sand may be directed to its point of greatest advantage to the pavement just in front of the tire.

In order to greater facilitate the flow of sand by gravity, I provide that the bottom 11 may be slanted from the center downwardly to each opening 16, or I may provide an incline 29 so arranged and attached to bottom 11.

The user may control the amount of sand to be dispensed, and by simply lifting his foot off of pedal 28, the spring 21 normally retracting will close caps 22 on tubes 17 and prevent more sand from passing. I also provide spring 30 on wires 25 adjacent pedal 28.

My wire 25 may be in the form of a strong metal length, or may be described as a cable or rod.

While I prefer that my tubes 17 be in vertical position, yet they may extend diagonally downwardly and either outwardly or inwardly. A diagonal tube is shown in FIGS 2 and 5.

Each of my tubes 17 is reinforced at its lower portion by collar 31 suitably attached thereto.

My device is physically operable, but it may be operable electrically by suitable electrical conections so that upon contact of the operator with pedal 28, each wire 25 will move rod 23 and spring 21 downwardly, to permit sand to flow to the pavement.

Having thus described my invention, I claim:

1. A skid control and traction device for a vehicle including a container positioned in the trunk of the vehicle for access and filling and adapted to hold flowable material such as sand, and having an incline leading to a hole in its lower portion, a tube cut at its middle portion to half of its diameter to form an opening with substantially half of its upper portion bent to form a flap bracket attached to said container, said tube positioned with its opening below and communicating with the hole in said container, a hollow coiled spring mounted within the lower portion of said tube, the upper portion of said coiled spring contacting and attached to said bracket, the lower end of said coiled spring having attached thereto a cap larger in diameter than the diameter of said tube for closing the bottom of said tube when the coiled spring is in retracted position, said tube positioned so that its lower end is directly in front of a rear tire of the vehicle, a rod attached to said coiled spring and extending within and above said tube, a wire attached on one end to said rod and extending to a pedal positioned on the floor of the vehicle near the driver's seat, said pedal adapted upon being pressed to move said wire, said rod and said coiled spring so that said cap is moved away from the bottom of the tube to permit sand from said container to flow out by gravity from said tube in front of the rear tire to the pavement to provide traction.

2. A skid control and traction device for a vehicle including a container positioned in the trunk of the vehicle for access and filling and adapted to hold flowable material such as sand, and having inclines leading to a pair of opposite holes in its lower portion, a pair of spaced tubes, each tube cut at its middle portion to half of its diameter to provide an opening with substantially half of its upper portion bent to form a flap bracket attached to said container, said tubes positioned with their openings below and communicating with the holes in said container, a hollow coiled spring mounted within the lower portion of each tube, the upper portion of said coiled spring contacting and attached to said bracket, the lower end of said coiled spring having attached thereto a cap larger in diameter than the diameter of the tube for closing the bottom of said tube when the coiled spring is in retracted position, said tubes positioned so that their lower ends are directly in front of the rear tires of the vehicle, a rod attached to said coiled spring and extending within and above each tube, a wire attached on one end to each rod and extending to a pedal positioned on the floor of the vehicle near the driver's seat, said pedal adapted upon being pressed to move said wires, said rods and said coiled springs so that said caps are moved away from the bottoms of the tubes to permit sand from said container to flow out by gravity from said tubes in front of the rear tires to the pavement to provide traction.

References Cited by the Examiner
UNITED STATES PATENTS

| | | | |
|---|---|---|---|
| 563,035 | 6/96 | Heiz | 291—36 |
| 772,218 | 10/04 | Cooper | 291—36 |
| 830,525 | 9/06 | Planta | 291—23 |
| 1,555,153 | 9/25 | Petrus | 291—28 |
| 1,578,206 | 3/26 | Petrus | 291—28 |
| 2,188,238 | 1/40 | Angle | 291—36 |
| 2,606,780 | 8/52 | Loftus et al. | 291—3 |

LEO QUACKENBUSH, *Primary Examiner.*